Sept. 26, 1933.  E. A. WALLIN ET AL  1,928,193
PRESSURE RESPONSIVE SWITCH
Filed Nov. 24, 1930   2 Sheets-Sheet 2
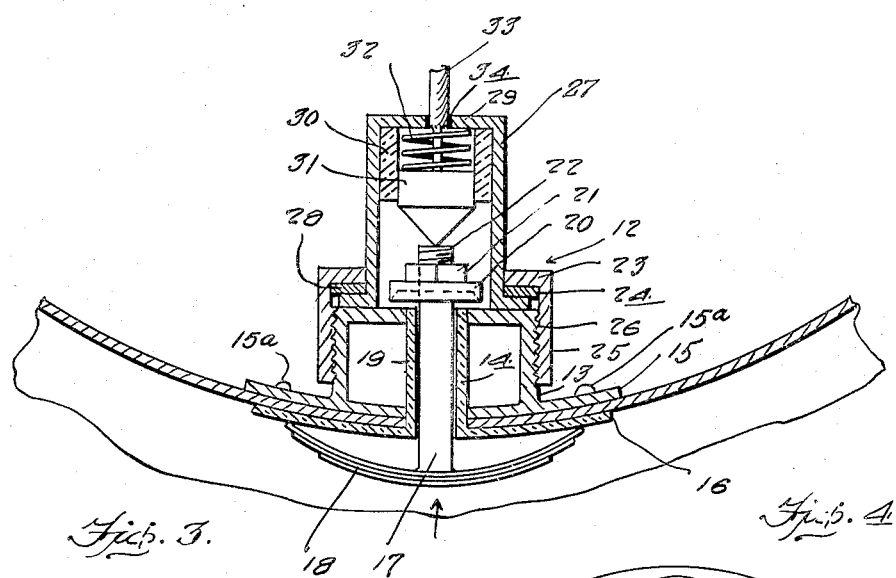
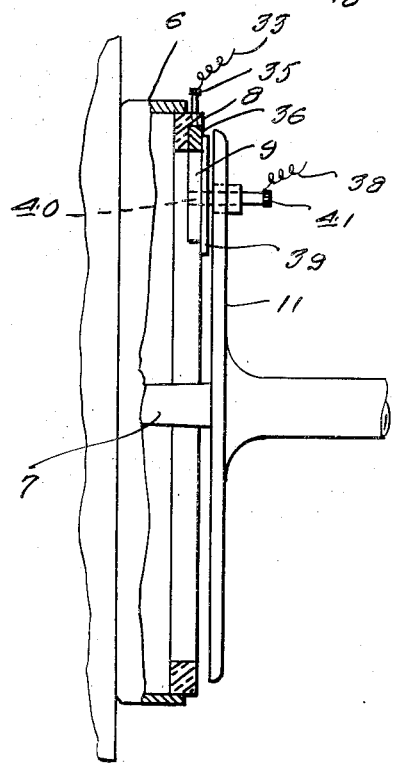
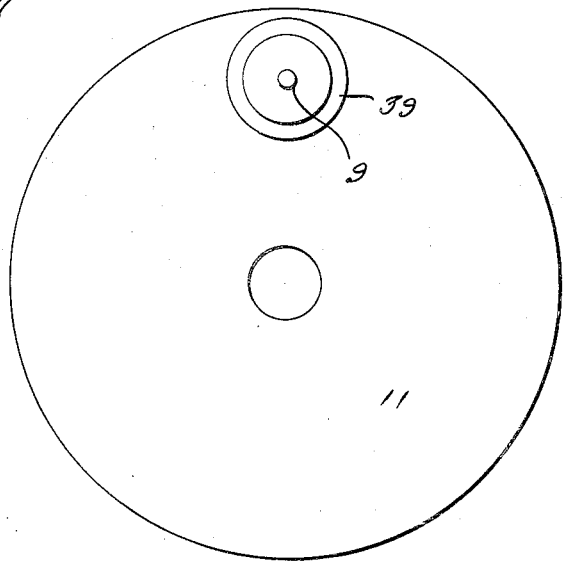
Inventors
E. A. Wallin
F. W. Neill
By Clarence A. O'Brien
Attorney Patented Sept. 26, 1933

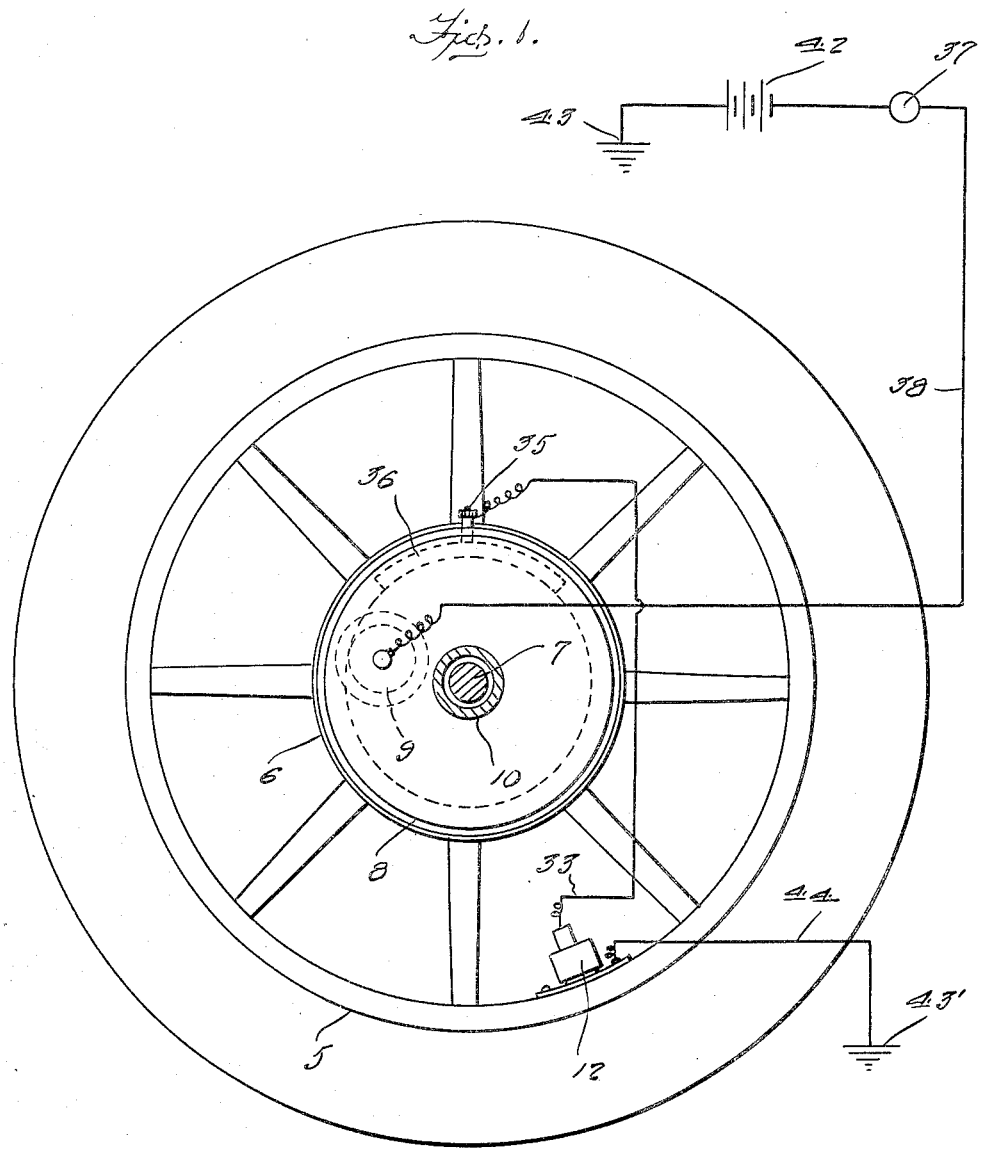

1,928,193

UNITED STATES PATENT OFFICE 1,928,193

PRESSURE RESPONSIVE SWITCH

Ernest A. Wallin and Fay W. Neill, Kimball, Nebr.

Application November 24, 1930
Serial No. 497,940

4 Claims. (Cl. 200—58)

This invention relates generally to pneumatic tire pressure indicators, and particularly to electrical tire pressure indicators, which are adapted to operate a signal on the instrument board of an automobile or the like.

It is an object of this invention to provide a device of this kind which is composed of few and durable parts, which may be comparatively easily and cheaply installed, and which is inexpensive to manufacture, and possesses many advantages and features of novelty which will be evident upon a reading of the following specification.

These and other objects of the invention, its nature and is composition and arrangement and combination of parts will be readily understood by any one acquainted with the art to which this invention relates upon consulting the following descriptions of the drawings, in which:

Figure 1 is a side elevation of an automobile wheel disclosing the arrangement and disposition of the main parts of my invention as they are installed and associated therewith.

Figure 2 is an enlarged vertical sectional view through the pressure responsive switch structure of my device.

Figure 3 is an edge view partly broken away of Figure 1 showing certain operative parts of my device and their relations.

Figure 4 is a plan view of one of the structural elements disclosed in Figure 3.

Referring in detail to the drawings, the numeral 5 designates generally the tire carrying rim of an automobile wheel, the numeral 6 the brake drum thereof, the numeral 7 the axle, the numeral 8 a dielectric ring mounted on the brake drum, the numeral 9 a wheel designed and positioned to contact said dielectric ring, and the numeral 10 a portion of an axle housing carrying the circular plate 11 on which the wheel 9 is mounted. A pressure responsive device 12 is mounted on the rim 5 of the wheel and projects radially inwardly therefrom as disclosed in Figures 1 and 2.

Referring to Figure 2 wherein the details of construction of the pressure responsive device 12 are clearly disclosed, it will be seen that it comprises a cylindrical housing 13 having a concentric passage surrounded by walls as at 14 and base flanges 15 which are attached as shown to the inward side of the rim 5. The same means 15a which attach the flanges 15 to the rim 5 also secure a flange 16 of insulating material on the underside of the rim 5 which flange 16 is formed upon the lower of the dielectric tube 14. Slidable in the cylindrical passage 14 is a bolt 17 which has at its end a flexible spring 18 which is adapted to engage against the flange 16, and resiliently retain bolt 17 against movement upwardly in the direction of the arrow. It should be said that the walls of the passage 14 designated by the numeral 19 are of the same character of insulated material as the flange 16, whereas the housing 13 and flange 15 are of metal. The upper end of the bolt 17 is provided with an adjustable contact head 20 maintained in adjustment on the bolt 17 by a lock nut 21 on the upper screw threaded portion 22 of the bolt. The spring 18 is adapted to be contacted by the expansible member or inner tube of the tire, so that it is readily affected by and is responsive to variations of pressure therein, so that the device has a high efficiency as a pressure responsive device for this purpose.

An annular ring 23 seating on a washer 24 has a depending internally screw threaded skirt 25 which screws upon the outside of the cylindrical housing 13 at 26. This ring and skirt operates to connect a relatively taller cylindrical hollow casing 27 which has a flange 28 on its lower edge projecting laterally for resting upon the upper end of the cylindrical housing 13. The flange 28 is adapted to be engaged and confined by the washer 24, so that it operates as a dust cap for preventing the intrusion of dust, water or other foreign matter or particles, which might reduce the effectiveness of the pressure responsive device. In the upper end of the taller cylindrical casing 27, which end is closed by a plate 29, is an annular insulating ring 30. A pyramidical block 31 is adapted to slide within the ring 30 and is spring pressed by a spring 32 normally in contact with the upper end of the bolt 17, so as to maintain constant contact with the said bolt during varying pressures within the tire, said pyramidical body having a metallic electrical connection to a cable 33 led through an aperture 34 in the top plate or wall 29 of the tall cylindrical casing. The electrical wire 33 is led to a binding post 35 which is electrically connected with steel arcuate segments 36 or a steel ring carried by the dielectric ring 8 which may be mounted on the brake drum 6 either inside or outside as may be decided to be best.

For making electrical connection with the segment 36 for completing a circuit through the pressure responsive member 12 to an instrument board indicator generally designated 37 by means of the cable 38 a contact wheel 9 is provided, which is flanged as indicated at 39 for making contact on two faces of the segment 36 shown in Figure 3. The wheel 9 may be mounted eccentrically or concentrically on a stub-shaft 40 which projects from the axle supported disk 11. Any suitable means (not shown) may be provided whereby the wheel 9 is spring pressedly and resiliently engaged with the ring 8, so as to compensate for wear and other defects of adjustment. The outer end of the stub-shaft 40 is provided with a binding post 41 to which is led the conductor cable 38 leading to the instrument board indicator 37 through the battery 42 and back to the ground 43, which is the frame of the automobile. It is provided that the housing 13 be grounded as at 43' either to a spoke of the wheel in the case of installation on a wire wheel or by means of a conductor 44 to a suitable portion of the axle housing or hub of the wheel.

The device described above is to be installed on each wheel of the automobile and operates under predetermined conditions. An individual signal for each tire equipped wheel having means identifying the tire to which it relates, is mounted upon the instrument panel or other suitable place in the automobile so that the operator of the automobile will be instantly warned when any of the tires of the automobile has become underinflated, and he is thereby enabled to take immediate remedial measures, before damage results to the underinflated tire or tires, and prevent an accident involving the security of the automobile and its passengers.

It is thought to be obvious that when the pressure in a tire becomes reduced below a predetermined pressure, the bolt 17 will be moved into the tire so as to bring the contact head 20 into electrical contact with the upper surface of the cylindrical housing 13 and close a circuit to the ground and to the instrument panel indicators by way of the battery of the car, and actuate the corresponding warning indicator on the instrument panel.

It is to be definitely understood that I do not desire to limit the application of this invention to the particular modification set forth herein to illustrate the principles thereof, and any change or changes may be made in materials or in the structure or arrangement of parts, within the spirit of the invention and the scope of the subjoined claims.

Having thus described the invention what is claimed as new is:—

1. A switch for mounting on the rim of the wheel, said switch comprising, a casing having a flange attached to the radially inward side of the rim about a hole therein, a tube of insulating material in the casing and projected through the hole in the rim, an insulating flange on the end of the said tube and engaged with the radially outward side of the rim, a bolt slidably carried in said tube and projecting inwardly and outwardly of the casing, a contact head on the inward end of the bolt adapted to be engaged with the casing, and an arcuate spring member on the outward end of the bolt for engaging the tire for moving said bolt radially outwardly upon a reduction of pressure in the tire, said spring member being freely engaged with the said insulating flange whereby to be out of electrical contact with the rim, and spring urged means carried by the casing for maintaining a continuous electrical connection with the bolt, said casing being electrically grounded.

2. A pressure responsive switch comprising a casing secured to the radially inward side of a tire equipped rim, a dielectric plate secured to the radially outward side of the tire rim opposite the casing, a dielectric tube extending from the dielectric plate through openings in the rim and in the radially outward and radially inward walls of the casing, a bolt slidable in the dielectric tube, a spring member on the radially outward end of the bolt and engaged with the dielectric plate for holding the bolt outwardly into engagement with the tire on the rim, a contact head on the remaining end of the bolt for electrically engaging with the inward wall of the casing when the tire is underinflated, a protective housing mounted on the casing and surrounding the inward end of the bolt, a dielectric bushing in the housing, a metal cylinder slidable in the bushing for electrically engaging the inward end of the bolt, and spring means for maintaining the cylinder in contact with the bolt during the movements of the bolt.

3. A pressure responsive switch comprising a casing secured to the radially inward side of a tire equipped rim, a dielectric plate secured to the radially outward side of the tire rim opposite the casing, a dielectric tube extending from the dielectric plate through openings in the rim and in the radially outward and radially inward walls of the casing, a bolt slidable in the dielectric tube, a spring member on the radially outward end of the bolt and engaged with the dielectric plate for holding the bolt outwardly into engagement with the tire on the rim, a contact head on the remaining end of the bolt for electrically engaging with the inward wall of the casing when the tire in underinflated, a protective housing mounted on the casing and surrounding the inward end of the bolt, a dielectric bushing in the housing, a metal cylinder slidable in the bushing for electrically engaging the inward end of the bolt, and spring means for maintaining the cylinder in contact with the bolt during the movements of the bolt, a flange on the casing, and attaching means traversing the flange of the casing, the rim, and the dielectric plate for securing the same together.

4. A pressure responsive switch comprising a casing secured to the radially inward side of a tire equipped rim, a dielectric plate secured to the radially outward side of the tire rim opposite the casing, a dielectric tube extending from the dielectric plate through openings in the rim and in the radially outward and radially inward walls of the casing, a bolt slidable in the dielectric tube, a spring member on the radially outward end of the bolt and engaged with the dielectric plate for holding the bolt outwardly into engagement with the tire on the rim, a contact head on the remaining end of the bolt for electrically engaging with the inward wall of the casing when the tire is underinflated, a protective housing mounted on the casing and surrounding the inward end of the bolt, a dielectric bushing in the housing, a metal cylinder slidable in the bushing for electrically engaging the inward end of the bolt, and spring means for maintaining the cylinder in contact with the bolt during the movements of the bolt, said spring member comprising an arcuate spring body secured intermediate its ends to the bolt so as to present the ends thereof in free engagement with the dielectric plate.

ERNEST A. WALLIN.
FAY W. NEILL.